(12) United States Patent
Coleman et al.

(10) Patent No.: US 7,956,108 B2
(45) Date of Patent: Jun. 7, 2011

(54) PRODUCT

(75) Inventors: Jonathan Coleman, Dublin (IR); Werner Blau, Dublin (IR); Martin Cadek, Dublin (IR)

(73) Assignee: The Provost, Fellows and Scholars of the College of the Holy and Undivided Trinity of Queen Elizabeth, Near Dublin, Dublin 2 (IE)

( * ) Notice: Subject to any disclaimer, the term of this patent is extended or adjusted under 35 U.S.C. 154(b) by 1074 days.

(21) Appl. No.: 11/526,228

(22) Filed: Sep. 25, 2006

(65) Prior Publication Data

US 2010/0304136 A1  Dec. 2, 2010

Related U.S. Application Data

(63) Continuation of application No. 10/855,577, filed on May 28, 2004, now abandoned.

(60) Provisional application No. 60/474,280, filed on May 30, 2003.

(51) Int. Cl.
*C08K 3/02* (2006.01)
*C08G 73/10* (2006.01)
*C08G 18/42* (2006.01)

(52) U.S. Cl. .................... 524/80; 524/847; 524/604

(58) Field of Classification Search ............. 524/80, 524/604, 847
See application file for complete search history.

(56) References Cited

U.S. PATENT DOCUMENTS

| | | | |
|---|---|---|---|
| 5,698,175 A | 12/1997 | Hiura et al. | 423/447 |
| 6,265,466 B1 | 7/2001 | Glatkowski et al. | 523/137 |
| 6,331,265 B1 | 12/2001 | Dupire et al. | 264/289 |
| 6,426,134 B1 | 7/2002 | Lavin et al. | 428/300 |
| 6,576,341 B1 | 6/2003 | Davey et al. | 428/376 |
| 2002/0001620 A1 | 1/2002 | Pienkowski et al. | 424/486 |
| 2002/0068170 A1 | 6/2002 | Smalley et al. | 428/403 |
| 2002/0127169 A1 | 9/2002 | Smalley et al. | 423/447 |
| 2002/0150524 A1 | 10/2002 | Smalley et al. | 422/198 |
| 2002/0161101 A1 | 10/2002 | Carroll et al. | 524/495 |
| 2003/0083421 A1 | 5/2003 | Kumar et al. | 524/496 |
| 2004/0022719 A1 | 2/2004 | Beguin et al. | 423/447 |

FOREIGN PATENT DOCUMENTS

EP  0949199 A1  10/1999

OTHER PUBLICATIONS

Delpeux et al, J. Nanosci, Nanotech, 2002, 2, pp. 481-484, High Yield of Pute Multiwalled Carbon Nanotubes from the Catalytic.
Yu et al, Phys Rev Ltrs, vol. 84, No. 24, Jun. 12, 2000, pp. 5552-5555, Tensile Loading of Ropes of Singles Wall Carbon. . . .
Walters et al, Appl Phys Ltrs, vol. 74, No. 25, Jun. 21. 1999, pp. 3803-3805, Elastic strain of freely suspended single-wall. . . .
Quian et al. Appl Phys Ltrs, vol. 76, No. 20, pp. 2868-2870, May 15, 2000, Load transfer and deformation mechanims in carbon. . . .
Davey et al, Synthetic Metals 103, 1999, pp. 2478-2479, Synthesis and Optical Properties of Phenylene-vinylene Copolymers.

(Continued)

*Primary Examiner* — William K Cheung
(74) *Attorney, Agent, or Firm* — Jacobson Holman PLLC

(57) ABSTRACT

Composite materials comprise nanotubes and a polymer. The nanotubes and polymer interact in an ordered fashion at an interfacial region. The interface is crystalline or semi crystalline.

16 Claims, 9 Drawing Sheets

OTHER PUBLICATIONS

Coleman et al, Adv Mater 2000, 12, No. 3, pp. 213-216, Phase Separation of Carbon Nanotubes and Turbostratic Graphite. . . .

Murphy et al, J Phys Chem B 2002, 106, pp. 3087-3091, High-Yield Nondestructive Purification and Quantification Method for. . . .

Cadek et al, Carbon 40, 2002, pp. 923-928, Optimisation of the arc-discharge production of multi-walled carbon nanotubes.

Pierard et al, Chem Phys Ltrs, 2001, 1-8, Feb. 16, 2001, Production of short carbon nanotubes with open tips by ball milling.

Grady et al, J Phys Chem B 2002, 106, pp. 5852-5858, Nucleation of Polypropylene Crystallizatioin by Single-Walled Carbon. . . .

Cadek et al, Appl Phys Ltrs, vol. 81, No. 27, Dec. 30, 2002, Morphological and mechanical properties of carbon-nanotube-. . . .

Panhuis et al, J Phys Chem B 2003, 107, pp. 478-482, Selective Interatction in a Polymer Single-Wall Carbon Nanotube Composite.

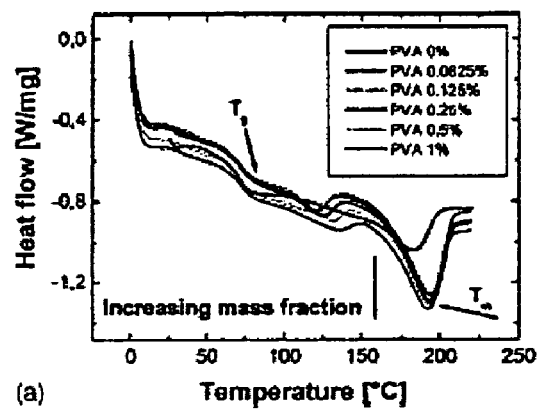
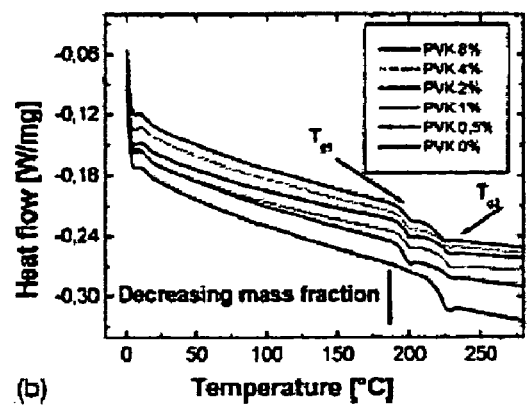
Fig. 9a            Fig. 9b
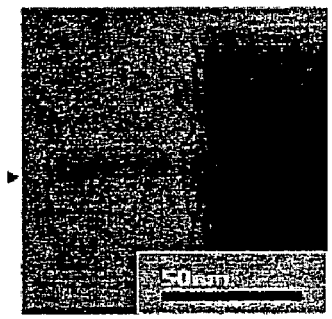
Fig. 10

PRODUCT

This U.S. Patent Application is a continuation application of U.S. patent application Ser. No. 10/855,577 filed May 28, 2004, now abandoned, which claims benefit of provisional 60/474,280 filed May 30, 2003.

The invention relates to composite materials comprising nanotubes.

Over the last 50 years the use of polymer composites has been exploited in many applications from biomedical devices to aerospace applications because of their excellent physical properties such as high strength to weight ratio.

Composite materials consist of two or more distinct physical phases. One of the phases may be a tube or fibre which is dispersed in a continuous matrix phase. Such composites offer a combination of properties not available in traditional materials. It is possible to introduce the fibres in the polymer matrix at highly stressed regions in a certain position, direction and volume in order to obtain the maximum efficiency from the reinforcement, and then within the' same member to reduce the reinforcement to a minimal amount at regions of low stress value. Other advantages offered by the material are lightness, resistance to corrosion, resilience, translucency and greater efficiency in construction compared with the more conventional materials.

The reinforcement of a low modulus polymer with a high modulus, high strength fibre uses the plastic flow of the polymeric material under stress to transfer the load to the fibre; this results in a high strength, high modulus composite. The aim of the combination is to produce a two-phase material in which the primary phase (i.e. the fibres) is well dispersed and bonded by a weak secondary phase (i.e. the polymer matrix). The principal constituents influencing the strength and stiffness of composites are the reinforcing fibres, the matrix and the interface between the fibres and the matrix.

When a fibre embedded in a matrix is subjected to a tensile load parallel to the fibre, the applied stress on the matrix will be transferred to the fibre across the interface.

The tensile stress in the fibre is zero at the fibre ends and increases along the fibre length to a maximum in the centre. Conversely the shear stress in the interface is a maximum at the fibre ends and reduces to almost zero in the centre. The rate of stress build up along the length of each of the fibres is dependent on the adhesion between fibres and matrix and their elastic properties.

The concept of load sharing between the matrix and the reinforcing constituent (fibre) is central to an understanding of the mechanical behaviour of a composite. An external load (force) applied to a composite is partly borne by the matrix and partly by the reinforcement. The product of the average stress in the matrix and its sectional area gives the load carried by the matrix across a section of the composite. The load carried by the reinforcement is determined similarly. Equating the externally imposed load to the sum of these two contributions, and dividing through by the total sectional area, gives a basic and important equation of composite theory, sometimes termed the "Rule of Averages".

$$f\bar{\sigma}_m + (1-f)\bar{\sigma}_f = \sigma_A$$

which relates the volume-averaged matrix and fibre stresses ($\bar{\sigma}_m$, $\bar{\sigma}_f$), in a composite containing a volume (or sectional area) fraction f of reinforcement, to the applied stress $\sigma_A$. Thus, the fibre and the remainder by the matrix will carry a certain proportion of an imposed load. Provided the response of the composite remains elastic, this proportion will be independent of the applied load and it represents an important characteristic of the material. It depends on the volume fraction, shape and orientation of the reinforcement and on the elastic properties of both constituents. The reinforcement may be regarded as acting efficiently if it carries a relatively high proportion of the externally applied load. This can result in higher strength, as well as greater stiffness, because the reinforcement is usually stronger, as well as stiffer, than the matrix.

The recently discovered carbon nanotubes (CNT) represent ideal carbon fibres for use on a polymer composite material. CNTs have the strongest bonds found in nature. It is well known and reported that CNTs have outstanding mechanical properties such as a Young's modulus of 1-2TPa and tensile strength of up to 60 Gpa [1,2]

CNTs have an extremely high elastic modulus and strain to failure coupled with a tensile strength an order of magnitude higher than for conventional carbon fibres. Therefore carbon nanotubes are especially valuable as reinforcement in polymer composite materials.

Numerous research, groups have investigated the reinforcement of polymer composites using CNTs with mixed and mostly limited success [3]. In general only reasonably low levels of reinforcement of order 50% increase were observed. Once in contact CNTs tend to be held tightly together by Van der Waals forces. In order to obtain good nanotube dispersion such forces which hold the nanotubes together must be overcome without adversely affecting the structure or property of the nanotubes.

The invention is directed towards providing a composite which will address these problems.

STATEMENTS OF INVENTION

According to the invention there is provided a composite material comprising
  nanotubes; and
  a polymer
wherein the nanotubes and polymer interact in an ordered fashion at the interface. The nanotubes and polymer may interact in a regular ordered fashion.

In one embodiment of the invention the interface comprises a regular coating of polymer on the nanotubes. The coating may be between 5 and 160 nm, typically between 5 and 80 nm and usually between 5 and 50 nm in width. The coating may in some cases be less than 10nm, preferably between 7 to 10 nm in width.

In one embodiment of the invention the interface is crystalline or semi crystalline.

The invention provides a composite material comprising nanotubes dispersed in a matrix wherein there is a crystalline or semi crystalline interface between the main body of the matrix and the nanotubes. The matrix may be a polymer matrix.

The invention also provides a composite material comprising nanotubes and a polymer matrix wherein the polymer forms a crystalline coating on the nanotubes.

The invention provides a composite material comprising nanotubes dispersed in a matrix wherein there is a crystalline or semi crystalline interface between the main body of the matrix and the nanotubes. The matrix may be a polymer matrix. In one embodiment the interface comprises a polymeric material and the interface is of a different polymeric material to that of the matrix.

The invention further provides a composite comprising nanotubes and a polymer matrix wherein the polymer forms a crystalline coating on the nanotubes.

The invention also provides a composite comprising nanotubes having a polymeric interface dispersed in a polymer matrix. The interface may be of a different polymer to that of the matrix.

A further aspect of the invention provides a method for preparing a composite of the invention comprising the steps of
  adding a polymer to a solvent to form a polymer solution;
  adding nanotubes to the polymer solvent to form a composite solution;
  sonicating the composite solution;
  allowing the solution to settle; and
  isolating the supernatant solution containing the composite.

The polymer may be amorphous, at least partially hydrophilic, amphiphilic or at least partially non-polar. The polymer may be at least partially hydrophobic.

The polymer may have a linear rod-like structure.

In one embodiment of the invention the polymer has a low cis-trans ratio. The polymer may have a trans content of greater than 80%, possibly greater than 90%, and possibly approximately 95%.

The polymer may be an isotactic or syndiotactic polymer.

In one embodiment of the invention the polymer has a Youngs Modulus of between 0.2 and 8 GPa, possibly between 0.2 and 4 Gpa, and may be between 0.2 and 2 GPa.

In one embodiment of the invention the polymer is a substantially non-crystalline polymer such as poly(m-phenylenevinylene-co-2,5-dioctyloxy-p-phenylenevinylene) (PmPV).

In one embodiment of the invention the polymer may be selected from any one ore more of polyvinylalcohol (PVA), polyvinylpyrrolidone (PVP), and polyvinyl-chloride (PVC). The polymer may be polyvinylacetate (PVAc), polyvinylalcohol-co-ethylene (PVA-co-E), polyvinylformal (PVF), polyvinylnaphtalene (PVN), polyvinylphenol (PVPh), polyvinylpyridine-co-styrene (PVPy-co-S), or any substituted polyalkane.

In one embodiment the nanotube is selected from any one or more of a carbon nanotube, a boron-nitride nanotube, inorganic nanowires made from silicon, germanium, inorganic nanotubes made from $MoS_2$, $WS_2$ or any generalised chalcogenide nanotubes.

The nanotube may be a carbon nanotube selected from a single wall nanotube (SWNT), a double wall nanotube (DWNT), a multiwall nanotube (MWNT) or a nanotube produced by arc discharge, laser processing or catylitic decomposition of carbon containing molecules.

BRIEF DESCRIPTION OF THE DRAWINGS

The invention will be more clearly understood from the following description thereof given by way of example only, with reference to the accompanying drawings; in which:—

FIGS. 9a and b are graphs showing DCS traces for PVA (FIG. 7a) and PVK (FIG. 7b) based composites;

FIG. 10 is a TEM micrograph of a PVA film after tearing due to exposure to a concentrated electron beam in the microscope;

DETAILED DESCRIPTION

The invention provides a polymer composite comprising nanotubes having a nanoscale crystalline polymer coating which greatly improves the physical and mechanical properties of the composite.

There is an increasing worldwide demand for polymer materials with improved physical and mechanical properties for applications ranging from the aerospace and space sector to high-tech automotive components. To avoid electrostatic charging of an insulating polymer matrix or to apply electrostatic painting processes, sufficient electrical conductivity of the polymer is needed.

In the present invention it was found that CNTs can be used very efficiently as a reinforcement agent when the CNTs are efficiently dispersed in a polymer matrix and a strong interfacial bonding between the CNTs and the polymer chains exists. This ensures that the applied load is carried by the reinforcement agent rather than by the polymer matrix.

A homogenous dispersion of fibre in the matrix provides efficient composites with accompanying improved load transfer. A nanometric shell of specific polymers is crystallised around the CNT which acts as a mediator between the tube and the matrix. In addition, the nanometric shell acts as an agent to aid dispersion if suitable side groups are attached to the polymer.

Figure 1:
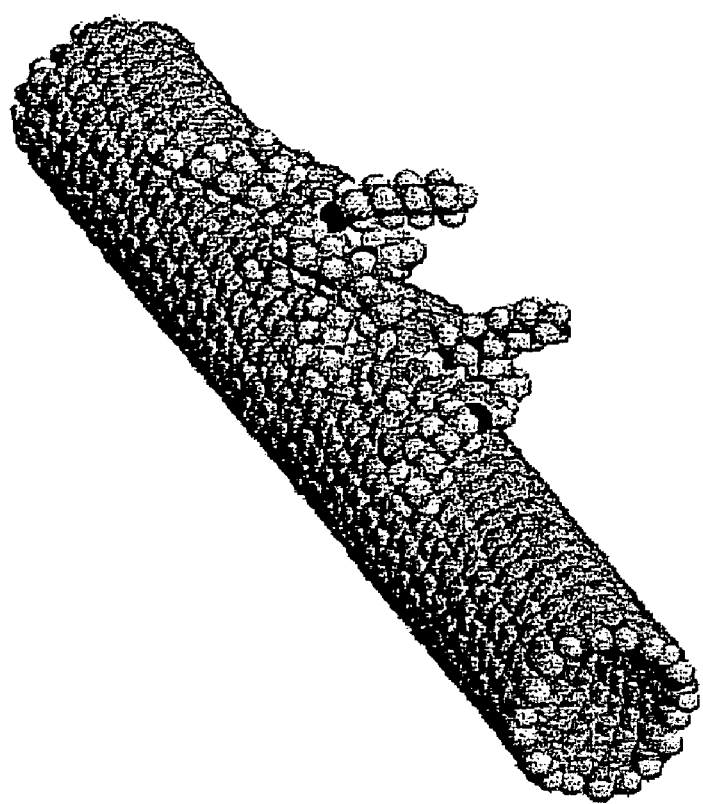
FIG. 1 is a representation showing a PmPV polymer (4 repeat units) wrapped onto a (12,7) carbon nanotube in vacuum. Carbon, hydrogen and oxygen atoms are shown in grey, white and red, respectively.

Computer simulations show that polymer conformation can change from its minimum energy configuration due to interactions with nanotubes as shown in the FIG. 1. From the polymer/nanotube structure shown it is possible to place a second and maybe a third PmPV running parallel to the tube length. Each PmPV provides a 120 degree covering of the tube. A dense coverage by the polymer is necessary on the tube surface to effectively disperse the tubes. Simulations of interactions with a graphite surface yielded no significant preference for alignment along the hexagon rows, both for polymer backbone and side-chain. It was found that the side-chain is very floppy and can deform itself easily on the nanotube surface. However, the polymer backbone has a preference to be "straight".

Results from the computer simulations indicate that the lowest energy configuration is where the polymer nanotube runs along the tube axis while side-chains of alternating phenyl rings adhere to the nanotube, although not necessarily along the row of hexagons.

A number of criteria are necessary in order for a crystalline coating to form around the nanotubes.

It was found that the greater part of the bonding between the polymer and the nanotube comes from the polymer backbone. In order for the crystallising coating on the nanotube to begin to form, the backbone of the polymer must be able to get close to the nanotube. Therefore the backbone of the polymer must be exposed. The backbone of ordered polymers are generally exposed, however in some cases where bulky side groups are attached the backbone can be twisted to impede binding.

Figure 2:
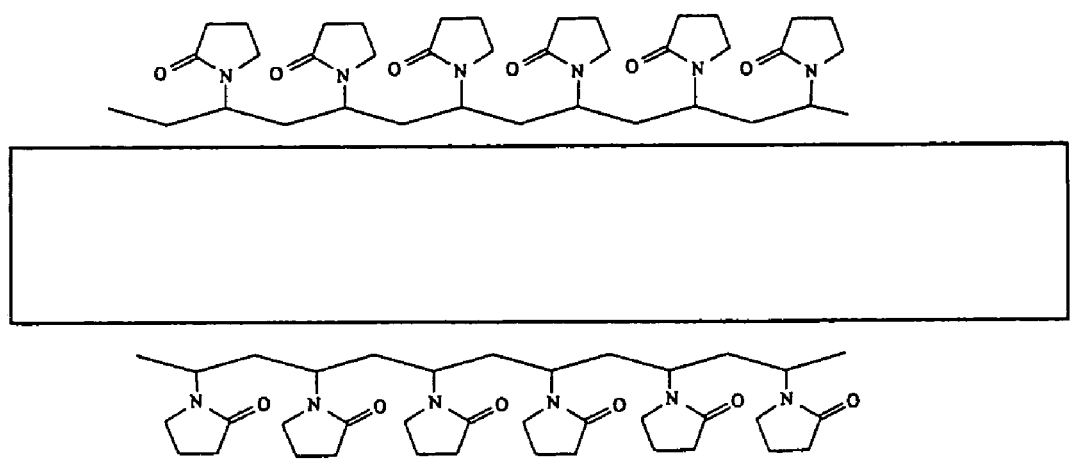
FIG. 2 is a representation showing the interaction of the polymer PVP with a nanotube.

The polymer should be hydrophilic or amphiphilic. The polymer must be at least partially non-polar. This means that some regions must exist that are free to interact with (the non-polar) nanotubes. If the polymer is completely hydrophobic, it can interact with the nanotube hydrophobic solvents such as toluene. If the polymer is amphiphilic, the non-polar regions can interact with the nanotube while the polar regions can interact with polar solvents such as water. An example of an amphiphilic polymer, polyvinylpropylene (PVP) interacting with a nanotube is shown in FIG. 2.

The arrangement of the sidegroups is also important in the formation of the crystalline shell around the polymer. The sidegroups should all preferably be on one side of the polymer chain to allow the hydrophobic part to interact with the nanotube. If they are arranged randomly the polymer-nanotube binding will be disrupted. The preferred polymer type is isotactic (all sidegroups on same side). In some cases syndiotactic (sidegroups on alternating sides of chain) polymers will also be able to form crystalline coatings.

The polymer chains must be reasonably rod-like and rigid to efficiently form crystalline regions. This is typically a property of vinyl type polymers. In the case of conjugated polymers it is important that if vinylene linkages are present a high trans/cis ratio is present, in order to retain order on the chain conformation. In addition, if meta linkages are present, they must be arranged in an ordered fashion on the chain ie every second ring.

Typically polymer-multiwalled nanotube (MWNT) composites are formed by mixing the required polymer with nanotubes in an appropriate solvent and mixing (using sonic energy). Composite films are then made for optical, electrical or mechanical testing by evaporation of the solvent.

In the present invention we have found using electron microscopy that the composite is not just a simple mixture of the individual components.

The method used in the preparation of the composites of the invention rely in the natural self assembly of the polymers on the nanotubes into their lowest energy configuration. This interaction occurs spontaneously when the conditions are correct.

Figure 3:
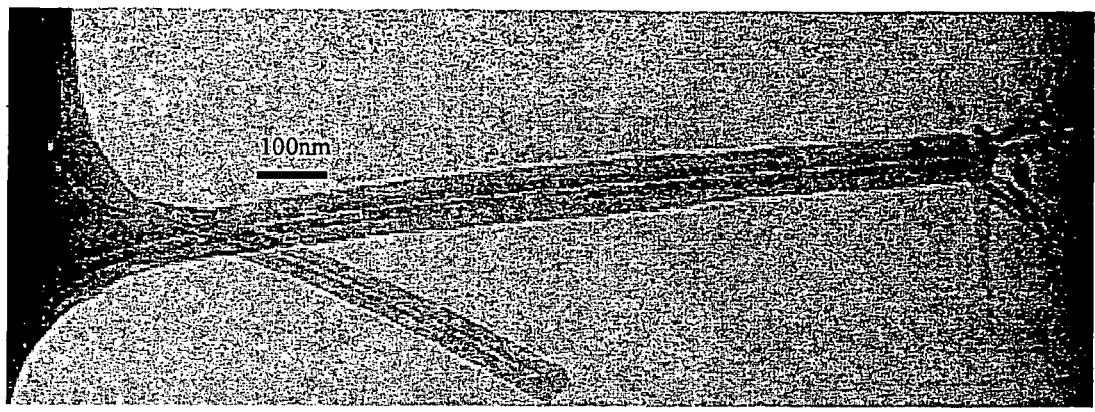
FIG. 3 is a TEM image showing two MWNT coated in PmPV polymer.

FIG. 3 shows a TEM image of two multiwalled nanotubes coated in polymer. The polymer covers the nanotubes in a regular coating of approximately 30 nm thick. The regularity of the coating indicates that the polymer-nanotube interaction is ordered.

It appears that the polymer forms a crystalline coating on the nanotube. The nanotube appears to act as a template for the polymer crystal. The polymer ordering would be expected to propagate some distance away from the nanotube.

The polymer in this instance is a luminescent polymer known as PmPV. It is well known that in a crystalline environment the luminescence in organic materials is decreased. Therefore it is possible to probe the crystallinity of the polymer in this system by measuring the luminescence as nanotubes are introduced into the polymer. A simple mathematical model was developed to describe how the luminescence falls for different fractions of nanotubes if this crystallinity is occurring.

The model predicts that $$PL = kV - p\frac{kV}{3}\left(\frac{a^2}{R_{NT}^2} + \frac{a}{R_{NT}} + 1\right)$$

PL is the luminescence intensity, kV is a constant, p is the volume fraction of nanotubes present, R is the nanotube radius and a is the thickness of the crystalline coating.

Figure 4:
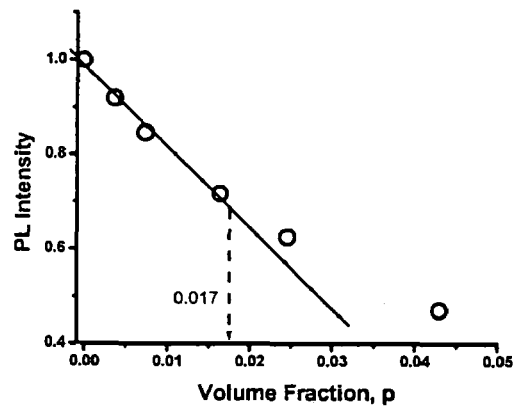
FIG. 4 is a graph showing the luminesecent intensity of the polymer PmPV in a crystalline environment.

FIG. 4 shows the results of these measurements. The solid line is a fit to the above equation. The thickness of the crystalline coating was measured to be approximately 50 nm.

Figure 5:
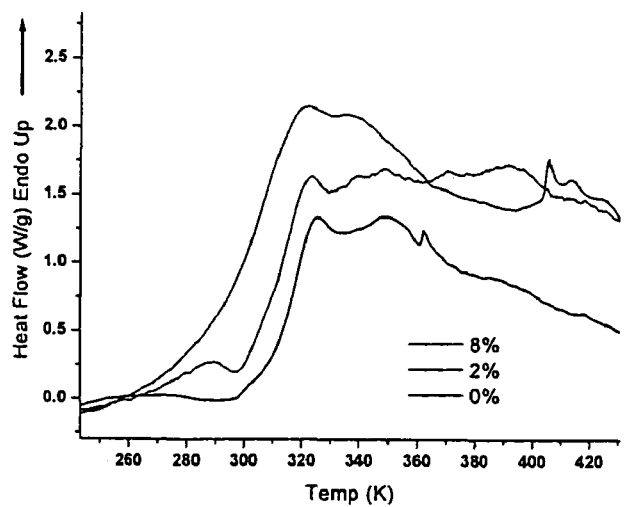
FIG. 5 is a graph showing the levels of crystallinity determined using Differential Scanning Calorimetry (DCS)

Differential Scanning Calorimetry (DSC) was also carried out. This is a standard technique to measure crystallinity. FIG. 5 shows the results of the samples, a film of pure PmPV, a film of PmPV with 2% MWNT and a film of PmPV with 8% MWNT.

The peaks are a measure of crystallinity in the material. It can clearly be seen that the peak area increases with the amount of nanotubes present. Detailed analysis shows that the amount of crystalline polymer doubles on the addition of the nanotube.

PmPV is a substantially non-crystalline material. PmPV has a crystallinity of approximately 20%. Introduction of the nanotubes significantly increases the crystallinity. In addition the new crystalline region is located at the surface of the nanotube.

In semi-crystalline polymers where crystallinity is approximately 20%, and crystalline polymers such as polyvinylalcohol (PVA), polyvinylpyrrolidone, (PVP) or polyphenylenevinylene (PPV) for example the polymer acts as a pre-structured crystallisation centre to allow the growth of nanometer thick crystalline layers on the nanotube. Hence, a very intimate contact between the CNT and the polymer matrix is formed and consequently the load transfer, as well as the CNT dispersion is significantly enhanced.

Polymer materials with improved physical and mechanical properties have valuable potential in many areas.

The degree of crystallinity required in a composite may differ depending on the application of the composite. The present invention provides the means to provide composites having differing degrees of crystallinity between the nanotubes and the polymer. For example in re-enforced plastics a high crystalline interface between the nanotube and polymer is preferred. For electrical applications a lower level of crystallinity would be preferred.

The invention will be more fully understood by way of the following examples.

EXAMPLE 1

The polymer used in this example is a variation on poly(para-phenylenevinylene) (PPV). The polymer was prepared by a Homer reaction between isophthalaldehyde and 2,5-dioctoxy-1,5bis (diethylmethylphosphonyl) benzene and is described in detail elsewhere (4) Alternate meta-phenylene linkages lead to an interruption of conjugation along the polymer backbone. Its flexible backbone and dimensions make it ideal for coating carbon nanotubes.

Figure 6:
FIG. 6 shows a TEM image of single-walled nanotube (SWNT) showing a "beaded" appearance of the polymer along the tube walls.

To initiate the interaction between the polymer and arc-grown single walled CNTs (SWNT) a solution of 20 g/L of PmPV in toluene is first prepared. SWNTs, (2% by weight), are added to form a composite solution of PmPV and SWNT in toluene. To bring the nanotubes and polymer into more intimate contact, this mixture was ultrasonicated at low power for several hours. When complete, the solution was black and appeared homogeneous with little precipitate. The solution was then allowed to settle for several days and the supernatant was then decanted and examined under transmission electron microscopy (TEM). Shown in FIG. 6 is a TEM image of SWNT, which had been completely solubilized in the PmPV-Toluene solution. The supernatant is composed almost entirely of nanotubes and polymer with no turbostratic graphite or polyhedra normally associated with arc grown materials. The sediment comprises nanotubes as well as turbostratic graphite, polyhedra, and catalyst particles indicating that the polymer has acted effectively as a filter and suspends only some nanotubes. Electron paramagnetic resonance studies confirm this (5). In the TEM images, a "beaded" appearance of the polymer along the tube walls is observed in some cases. This is noticeable in the single-walled nanotube image shown in FIG. 6

EXAMPLE 2

In order to bypass impurity problems such as catalytical particles or amorphous and turbostratic graphite a method optimized by Murphy et al (6) was used for non destructive purification of the different nanotube samples. As a matrix material, polyvinyl alcohol (PVA) was chosen. PVA is soluble in water and was mixed in a concentration of 30 g/L using an ultra high power sonic tip for 1 min.

As reinforcing agents two different Multi-walled CNTs (MWNT) were used (N-MWNT's and O-MWNT's). N-MWNT's show an average diameter of 14 nm and lengths of approximately 50 μm. They were pre-purified by oxidation. O-MWNT were measured to have an average diameter of 16 nm and lengths of up to 1-5 μm10. O-MWNT's were pre-purified by acid treatment in HCL. For comparison arc grown aMWNT's having an average diameter of 25 nm and an average length of 1 μm were used. The purity of the raw material was 30-40%. HipCo-SWNT's purchased from CNI (Carbon Nanotechnologies Incorporated) are known to have an average diameter of 1 nm but were arranged in bundles of an average diameter of 7 nm. The purity of HipCo-SWNT's was found to be 80% whereas 20wt % catalytically iron particles could be observed.

In order to disperse the nanotube samples 1 wt % of N-MWNT, O-MWNT and HipCo-SWNT were sonicated into the PVA/H2O solution with an ultra high power sonic tip for 5 min and placed afterwards for 2 hrs into a low power sonic bath. This was followed by an additional sonication for 5 more min using the sonic tip.

In case of the aMWNT sample 25 wt % of nanotubes were added into the PVA/H2O solution and sonicated for 1 min using the sonic tip. This was followed by a mild sonication for 2 hrs in the sonic bath.

All samples were afterwards left undisturbed for 24 hrs in order to allow impurities to form a sediment on the bottom of the sample bottle. The resulting solution rich in nanotubes was then decanted while the sediment consisting of impurities remained in the sample bottle.

These solutions were then blended with PVA/H2O solution to produce a range of various mass fractions. 1 ml of each sample was dropped onto a polished Teflon disk (30 mm in diameter) and placed into a 60° C. heated oven in order to allow the solvent to evaporate and form a polymer film. This procedure was repeated 4 times resulting in a 200-300 micron thick bulk polymer film. These films could be easily peeled of the Teflon disks and were cut into 10×4 mm rectangular stripes in order to perform tensile testing.

Tensile testing was carried out on a Zwick Z100 using a 100N load cell and a cross head speed of 0.5 mm/min.

In order to analyse the results mass fractions were transferred into volume fraction assuming a density of 2.16 g/cm$^3$ for both aMWNT's and cMWNT's6 and a density of 1.5 g/cm$^3$ for HipCo-SWNT's11.

Figure 7:
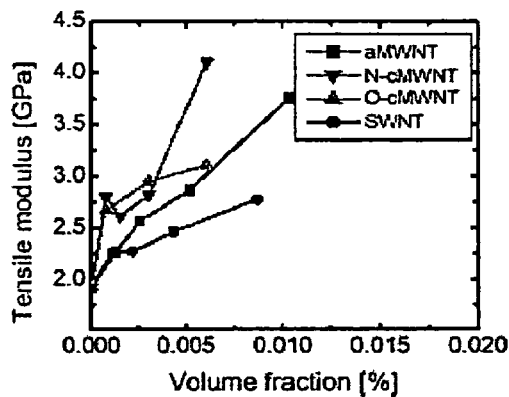
FIG. 7 is a graph showing the tensile modulus of polyvinylalcohol—MWNT composite films as a function of nanotube volume fraction.

As seen in FIG. 7 the tensile modulus of polyvinyl alcohol could be increased by a factor of more than 2 from 1.9 GPa to 4.1 GPa while adding less than 1 wt % of N-cMWNT to the matrix. This corresponds to a volume fraction of 0.6vol %. In case of the a-MWNT the tensile modulus could be increased by a factor of 2 from 1.9 GPa to 3.75 GPa while having 1.8 wt % of nanotubes in the matrix.

For the O-cMWNT it can be observed that an increase of 70% from 1.9 GPa to 3.11 GPa can be seen while adding a volume fraction of 0.6 vol % of nanotubes.

The Hipco-SWNT/PVA composite showed only an increase of 50% from 1.9 GPa to 2.77 GPa. This can be explained by the well known effect of rope formation by SWNT's.

Figure 8A:
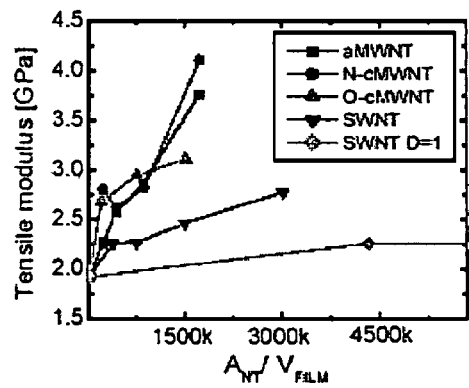
FIG. 8a is a graph showing the tensile modulus increase for polyvinyl alcohol plotted versus total surface area of nanotube per unit volume of polymer film.

As the polymer/nanotube interaction occurs at the nanotube surface the nanotube surface area is expected to be an important parameter. Total nanotube surface area is related to the volume fraction. In FIG. 8a volume fraction has been converted to surface area using the measured nanotube diameters and it can be observed that all the tensile moduli for MWNT's fall onto the same line. Using the real diameter value of HipCo-SWNT's of 1 nm it can be seen that the results do not agree with the MWNT samples. Using the measured average diameter value of 7 nm it can be observed that the tensile modulus increases in line with MWNT's, but not as much as expected. This indicates that buddle formation leads to lower performance. The interfacial shear strength in a nanotube buddle is known to be lower than between nanotube and a polymer matrix and indicates that sliding of the tubes within the bundle occurs and therefore a low increase of tensile modulus can be seen. Bundle formation of SWNT's can also be observed in scanning electron microscopy graphs (not shown here).

Figure 8B:
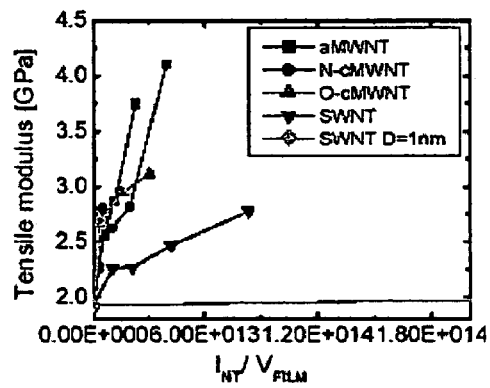
FIG. 8b is a graph showing the tensile modulus increase for polyvinyl alcohol plotted versus total nanotube length per unit volume of polymer film.

FIG. 8b shows the tensile modulus increase plotted versus the calculated total length of nanotubes induced per volume of polymer film. Similar to FIG. 8a the tensile moduli for MWNT's are falling to the same line in comparison to the SWNT's results using the real diameter value of 1 nm.

The fact that the tensile moduli for all the MWNT samples fall into the same area indicates that the length of nanotube does not play a major role for mechanical reinforcement of composites. It is well known that catalytically grown MWNT are an order of magnitude longer than arc discharge grown.

EXAMPLE 3

The polymers used in this study were polyvinyl alcohol, PVA and poly~9-vinyl carbazole, PVK. These materials were purchased from Aldrich and used as supplied. A range of composite solutions were prepared by adding arc discharge MWNT soot, produced in TCD, to 30 g/l solutions of PVA and PVK in their respective solvents, de-ionized water and dichloromethane. True nanotube mass fractions were measured by thermogravimetric analysis Mettler TA 4000 and were found to range between 0.1 and 1 wt % for PVA and 1.5 and 8 wt % for PVK. Films were formed on glass substrates by drop casting for PVA composites and spinning multiple layers in the case of PVK. Film thicknesses were measured by white light interferometry and were greater than one micron in all cases. Both DSC TA Instruments DSC-2920 and thermogravimetric analysis measurements were carried out on free standing films with special care being taken to remove environmental moisture. In both cases the scan rate was 10 K/min. To perform transmission electron microscopy Hitachi H-7000 formvar coated copper grids were dipped into composite solutions and allowed to dry in ambient conditions.

To determine the differences in interfacial bonding for the two host polymers differential scanning calorimetry (DSC) measurements were carried out. FIG. 9 shows DSC traces for the PVA (FIG. 9a) and PVK (FIG. 9b) based composites, respectively. For PVA based composites, melting behavior is observed around 170° C. Analysis of this peak gives the percentage crystallinity of 14% for pure PVA. On the introduction of nanotubes, however, the crystallinity increases sharply to 24% before rising to 27% as the MWNT content is increased to 1 wt %. This shows that the nanotubes act as nucleation sites for the crystallization of PVA. In addition the presence of a shell of crystalline polymer around each nanotube appears to strongly enhance the stress transfer and, hence, the overall composite mechanical properties. It appears that the amplified crystallinity acts as an additional component of reinforcement, thus increasing the modulus above the levels expected from the nanotubes alone.

In contrast PVK composites show typical thermal behaviour for amorphous materials. They exhibit only glass transition points with no melting peaks and, hence, no crystallinity is observed. While a second Tg is observed for the PVK composites this suggests the creation of a second phase but not a crystalline one.

In order to understand the fracture mechanism in the MWNT/PVA composite TEM studies were performed.

Shown in FIG. 10 is a TEM micrograph of a PVA film after tearing due to exposure to a concentrated electron beam in the microscope. On magnification of the right side of FIG. 7 a nanotube can be observed protruding from the polymer fracture zone. It is likely that local heating of the film by the beam caused, contraction resulting in the nanotube being pulled from the polymer. This image clearly shows this nanotube coated with a thin layer of crystalline polymer. This is a remarkable result as it shows that the polymer did not break at the polymer-nanotube interface suggesting extremely strong interfacial interaction.

EXAMPLE 4

Demonstration of Crystallinity Nucleated by a Range of Nanotube Types

We have found that the presence of a crystalline polymer coating around nanotubes in composite materials is important for the resulting mechanical properties of these materials. We have found that this crystalline coating occurs for all nanotube types. We have made composites from polyvinylalcohol and a range of nanotube types. These materials were tested in the solid state for the presence of crystallinity. In all cases the crystallinity was observed to increase linearly with nanotube content demonstrating that a crystalline coating forms around all tube types studied.

The nanotubes used were double-walled nanotubes (DWNT) from Nanocyl S.A. (Belgium), arc grown multiwall nanotubes (AMWNT) (Ref. 7), catalytic multiwall nanotubes (NMWNT) from Nanocyl S.A. (Belgium), catalytic multiwall nanotubes (OMWNT) produced in Orleans, France, (Ref. 8) and nanotubes with hydroxyl groups covalently bonded at the tips using ball milling under constant hydrogen flow (OHMWNT) (Ref. 9).

A range of composite dispersions were prepared for each nanotube type by adding the nanotube material to 30 g/l solutions of PVA in water. PVA ($M_w$=(30 k-70 k)g/mol) used in this investigation was purchased from Sigma-Aldrich [product code: 9002-89-5] and used as supplied. In case of AMWNT a mass fraction of 25% soot relative to the polymer content was added to the polymer solution. This solution was mixed and purified as described previously and the true nanotube mass fraction measured by thermal gravimetric analysis. For all other nanotube types, the mass fraction added to the polymer solution was 1 wt %. These samples were sonicated for 5 minutes using a high power sonic tip followed by a mild sonification for 2 hrs followed by further high power sonification for additional 5 min.

To fabricate free-standing composite films, 1 ml of each solution was pipetted onto a polished Teflon disk and placed in a 60° C. heated oven to allow evaporation of the solvent. This procedure was repeated 4 times on each disk in order to obtain films with thicknesses of up to 0.5 mm. The films were peeled off the substrates and cut into strips of ~10 mm×4 mm×0.3 mm to perform mechanical testing. Prior to testing, all specimens underwent an additional drying procedure for 1 hour at 60° C. to evaporate any remaining water. The width and thickness of each strip were measured using a low torque digital micrometer. The volume fraction of NT in each film was calculated from the mass fraction using the densities, $\rho$=1300 kg/m$^3$ for PVA, $\rho$=1500 kg/m$^3$ for DWNT and SWNT and $\rho$=2150 kg/m$^3$ for all MWNT.

Furthermore, morphology and thermal properties of the composites were studied by differential scanning calorimetry (DSC) using a Perkin Elmer Diamond DSC power compensation instrument. Scanning rate was 40K/min where approximately 10 mg of each sample was measured and analyzed.

Figure 11:
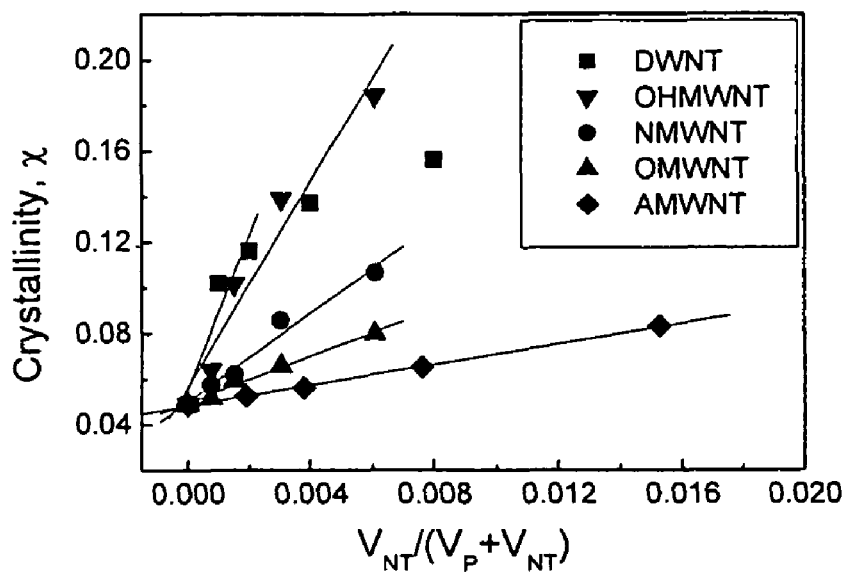
FIG. 11 is a graph illustrating crystallinity increase for composites versus volume fraction for a range of nanotubes.

As the surface area appears to play a fundamental role in the reinforcement mechanism it is important to understand the nature of the interface for each composite type. To do this, DSC measurements were carried out on all films. In all cases a large melt peak was observed at approximately 160-200° C. indicating a degree of polymer crystallinity in all composites. This crystallinity was calculated and was observed to increase with nanotube content. Shown in FIG. 11 is the linear increase of crystallinity for all PVA/CNT samples plotted versus the volume fraction of CNT present. This linear increase in crystallinity suggests that each CNT has a crystal coating with an average thickness that is constant for each nanotube type. This shows that all samples used in this study had a similar (crystalline) polymer nanotube interface. It should be pointed out that for the DWNT samples, the crystallinity is linear with $V_f$, only at low $V_f$. This is consistent with the bundling of DWNT at higher $V_f$ suggested above.

It is possible to derive a simple equation relating the thickness of the crystal coating to the rate of increase of crystallinity with volume fraction:

$$\left(\frac{b}{R}\right)^2 + 2\left(\frac{b}{R}\right) - \frac{d\chi}{dV_f} = 0 \qquad \text{equation 4}$$

where b is the crystal coating thickness, R the radius of the CNT, $V_F$ is the volume fraction of CNT and $\chi$ the crystallinity. This equation can then be used to calculate the thickness of this coating. This model gives crystal coating thickness ranging from 10 nm for AMWNT to 29 nm for OHMWNT. This shows that PVA can crystallise on the surface of both well graphitised NT such as AMWNT and poorly graphitised NT such as those that are catalytically grown. This suggests that the crystallinity is not templated by the hexagonal lattice of the nanotube but can occur on any cylindrical NT surface.

EXAMPLE 5

High Performance Nanotube Reinforced Plastics

Experimental Procedure

For this study polyvinyl alcohol (PVA) was used as the polymeric matrix. The nanotubes used in this study were purified catalytic "Thin MWNT" were obtained from Nanocyl S.A. (www.nanocyl.com).

Polyvinyl alcohol (PVA) was used as a matrix as described above. A range of composite dispersions were prepared by adding the nanotube material to 30 g/l solutions of PVA in deionised water. The PVA ($M_w$=(30 k-70 k)g/mol) used in this investigation was purchased from Sigma-Aldrich [product code: 9002-89-5] and used as supplied. A stock composite solution was prepared by adding a mass fraction of 1 wt % MWNT to the polymer solution. This was then sonicated for 5 min using a high power sonic tip (600 W, 20%) followed by a mild sonication for 2 hrs in a sonic bath followed by further high power sonication for additional 5 min. A range of mass fractions were fabricated by blending this stock solution with a solution of pure PVA in the required concentrations. We have found that the polymer-nanotube interaction in this case is non-covalent (van der Waals).

To fabricate free-standing composite films, 1 ml of solution was pipetted onto a polished Teflon disk and placed in a 60° C. heated oven to allow evaporation of the solvent. This procedure was repeated 4 times on each disk in order to obtain films with thicknesses of up to 0.5 mm. The films were peeled off the substrates and cut into strips of ~10 mm×4 mm×0.3 mm to perform mechanical testing. Prior to testing, all specimens underwent an additional drying procedure for 1 hour at 60° C. to evaporate any remaining water. The width and thickness of each strip were measured using a low torque digital micrometer. For all samples four films were measured, the results analysed and the mean and standard deviation calculated. The volume fraction of NT in each film was calculated from the mass fraction using the densities, $\rho$=1300 kg/m$^3$ for PVA and $\rho$=2150 kg/m$^3$ for MWNT.

Scanning electron microscopy measurements were carried out using a Hitachi S4300. Samples were prepared by immersing the films in liquid nitrogen before fracture. The fracture surface was investigated by tilting the sample at an angle of 45° to the beam. This allowed the measurement of the pullout length of any protruding nanotubes. Pullout lengths were corrected to account for the tilt and the distribution of angles. Transmission electron microscopy was performed using a Hitachi H-7000. Formvar coated copper grids (mesh size 300) were dipped into nanotube dispersions and allowed to dry in ambient conditions.

Morphology and thermal properties of the composites were studied by differential scanning calorimetry (DSC) using a Perkin Elmer Diamond DSC power compensation instrument. Scanning rate was 40 K/min where approximately 10 mg of each sample was measured and analyzed. Tensile testing was carried out using a Zwick Z100 tensile tester. A 100 N load cell and a cross head speed of 0.5 mm/min were used to obtain stress strain curves.

We have used a solution-based composite fabrication technique which leads to free standing composite films with very good nanotube dispersion. Purified, catylitic "Thin MWNT" were used. The nanotubes were simply mixed with a solution of polyvinyl alcohol (PVA) in water, giving a good nanotube dispersion. In these composites the polymer-nanotube interaction is strictly non-covalent (van der Waals). A range of mass fractions were produced and free-standing films cast.

These materials display large increases in modulus of approximately a factor of ×3-4 at less than 1 vol % MWNT. In addition strength and toughness increase by factors of ×3-4 and ×2-5 were observed at similar volume fractions. All data was analysed using short fibre theory. In addition we demonstrate the importance of the polymer interface region. Furthermore a model is developed to describe the strength as a function of volume fraction in these materials, showing the reinforcement to be proportional to the thickness of any interface region.

Figure 12:
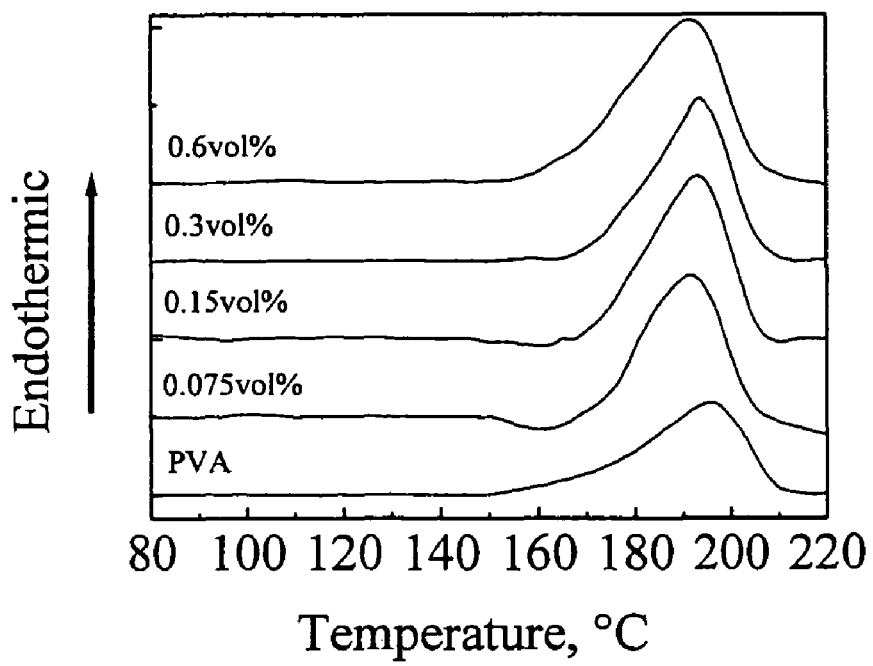
FIG. 12 is a plot of differential scanning calorimetry curves for PVA based composites as a function of nanotube fraction. It will be noted that the area under the melt peak (160 to 210° C.) increases with nanotube content.
Figure 13:
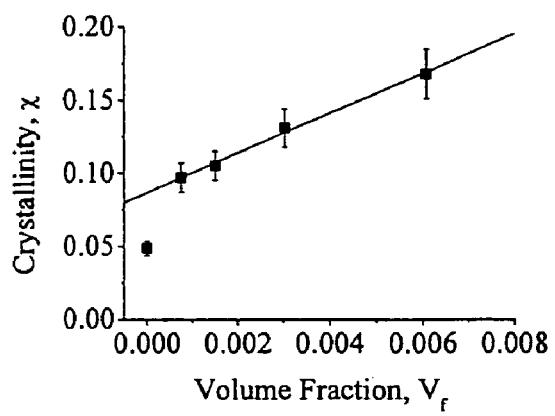
FIG. 13 is a graph of crystallinity as calculated from the DSC melt curves versus volume fraction for PVA based composite samples. The straight line is a fit to equation 3.

In order to understand the morphological properties of the composite films, differential scanning calorimetry (DSC) measurements were carried out on all films. For all PVA based composites the DSC curves are shown in FIG. 12. A large melt peak was observed at approximately 160-210° C., indicating polymer crystallinity in all samples. This crystallinity was calculated and was observed to increase linearly with nanotube content as shown in FIG. 13. A linear increase of crystallinity with volume fraction suggests that each nanotube has a crystalline coating associated with it. Thus this linearity is the signature of the nucleation of local polymer crystallinity by the nanotubes. These crystalline-coated nanotubes are in turn embedded in a partially crystalline matrix. We can derive an equation relating the thickness of this crystalline coating to the volume fraction of nanotubes by considering the crystallinity as two components, that associated with the bulk polymer and that associated with the nanotubes. If we assume a cylindrical geometry for the nanotube-nucleated coating, we can write an equation for the composite crystallinity, $\chi$, as a function of the number of nanotubes in the film, N. In this equation the first term relates to the bulk polymer crystallinity while the second term relates to the nanotube-induced crystallinity.

$$\chi = \frac{V_0 + N[\pi(R+b)^2 l_{NT} - \pi R^2 l_{NT}]}{V} \qquad (1)$$

where $V_O$ is the volume of crystalline regions not associated with nanotubes, R is the average nanotube radius, b is the average thickness of the crystalline coating, $l_{NT}$ is the nanotube length and V is the film volume. In addition the nanotube volume fraction, $V_f$, is defined by:

$$V_f = \frac{N\pi R^2 l_{NT}}{V} \quad (2)$$

Combining these equations gives an expression for the crystallinity as a function of volume fraction:

$$\chi = V_f \left[ \frac{b^2}{R^2} + 2\frac{b}{R} \right] + \frac{V_0}{V} \quad (3)$$

This equation can be fitted to the data in FIG. 13 and gives a value of b/R=2.77±0.04. As microscopy studies have shown the nanotube radius to be R=7.5±2.5 nm this results in an average value of b=21±7. nm. This is an interesting result as not only does it show that the nanotubes nucleate polymer crystallisation but that crystallinity can propagate for a large distance from the nanotube surface. In addition, this shows that at the interface the nanotubes interact with a crystalline polymer surface. As an ordered interface will result in a virtually complete polymer coating, the total polymer-nanotube binding energy will be maximised. This will result in the maximisation of interfacial stress transfer.

Figure 14:
FIG. 14 are SEM images of the fracture surfaces for PVA based composites.

To further characterise the internal structure of the films, SEM images were taken of fracture surfaces of high volume fraction composites from both matrix materials as shown in FIG. 14. In each case a large number of nanotubes that have been pulled out of the film can be seen. These nanotubes are distributed reasonably uniformly, indicating a good dispersion. For PVA composites the diameter of the pulled-out, coated nanotubes was measured to be 65±15 nm. Using the measured value for the nanotube radius of R=7.5±2.5 nm, this gives a coating thickness, b, of 25±10 nm. This value for the PVA based composites is very close to the value of b=21±7 nm for the thickness of the crystalline coating, extracted from the DSC measurements. Thus, combining the DSC and SEM data gives strong evidence that the polymer morphology near the nanotubes is different from the bulk morphology. In addition, the polymer layer coating the nanotubes is almost certainly crystalline. Furthermore there appears to be a strong correlation between the position of the fracture surface and the edge of this crystalline coating. This suggests that the effect of the crystalline coating is to displace the fracture surface away from the polymer-nanotube interface.

Figure 15:
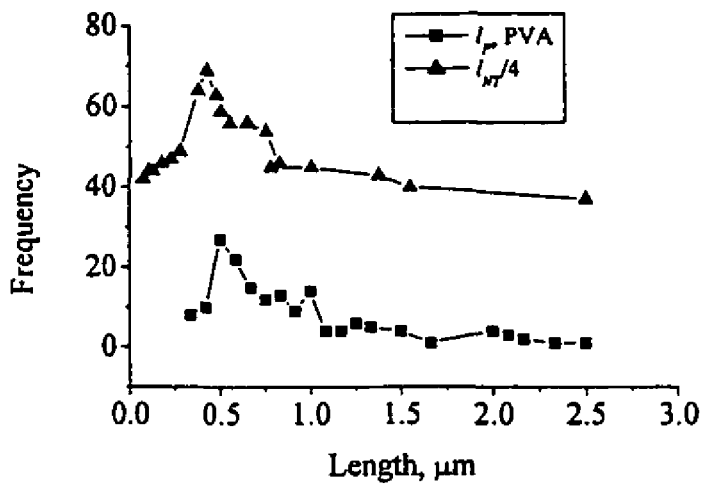
FIG. 15 is a histogram of pullout lengths from fracture surface for high volume fraction based PVA based composites. This data has been corrected for the tilt angle and scaled by a factor of 1.18 to take into account the range of angles at which nanotubes protrude. For comparison the data for the pristine nanotubes is also presented. This data is scaled to represent a quarter of the nanotube length. In this figure, the data has been shifted vertically by 20 for clarity.

In addition, the pullout length, $l_P$, of the nanotubes was measured and this data is shown as a histogram in FIG. 15. In each case this data peaks strongly while displaying a long tail to higher lengths. The most probable pullout lengths were measured to be 0.53±0.08 μm. In addition the length distribution of the nanotubes themselves was measured using TEM giving a most probable nanotube length of 1.71+0.4 μm. This data is displayed for comparison purposes in FIG. 15 as $l_{NT}/4$. It is clear from this graph that the pullout length is very close to a quarter of the total nanotube length.

Figure 16:
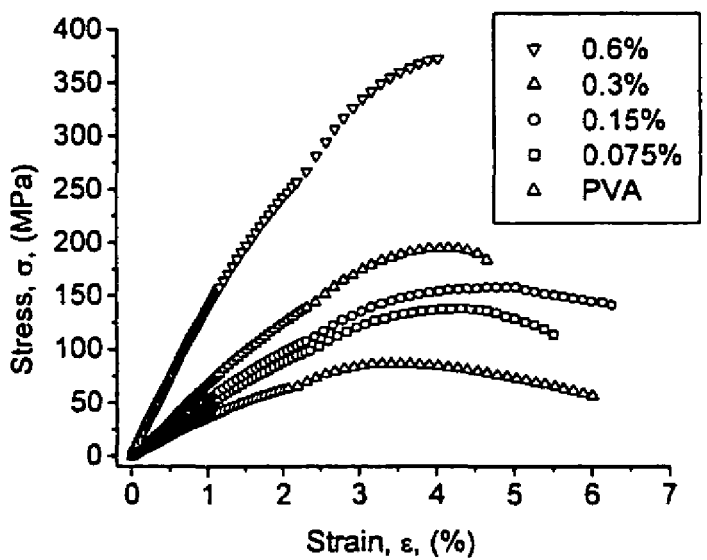
FIG. 16 are representative stress-strain curves for PVA based composites for a range of nanotube volume fractions.

Shown in FIG. 16 are the stress-strain curves for the PVA based composites. In all cases the curves are linear at low strain followed by plastic deformation in the region of 3% strain. At higher strains the films yield up to a breaking strain of 6% for the pure polymer. This breaking strain tends to decrease with increasing nanotube content and occurs at approximately 4% for the 0.6 vol % composite. In addition the Young's modulus, strength and toughness tend to increase with increasing nanotube content as will be described below.

Figure 17:
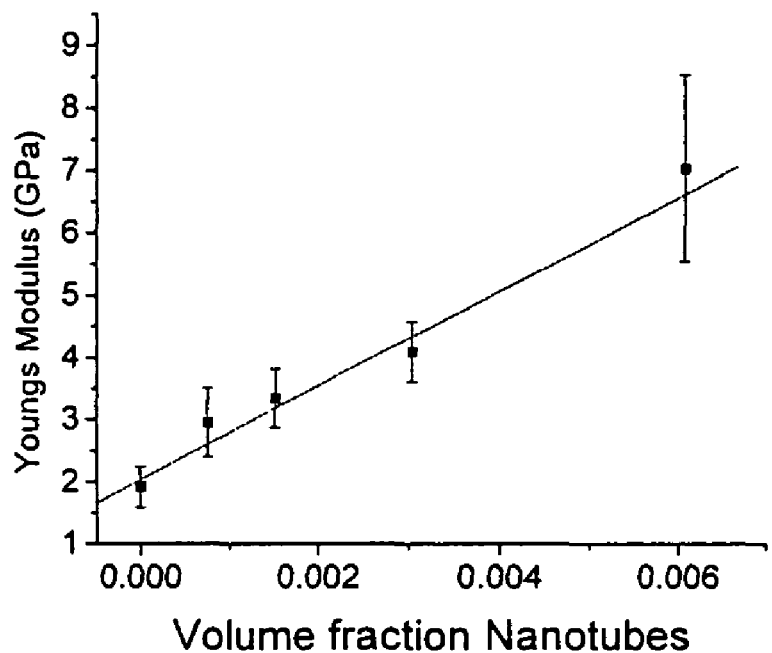
FIG. 17 is a plot of Young's moduli as a function of volume fraction for PVA based components.

The Youngs moduli, $Y_C$, for composite films as a function of volume fraction are shown in FIG. 17. For the PVA based composites $Y_C$ increases linearly from 1.92±0.33 GPa for the pure polymer to 7.04±1.5 GPa for the 0.6 vol % sample with a slope of $dY/dV_f$=754±91 GPa. This increase, by factors of ×3.7 at very low volume fraction, represent a very high reinforcement level.

This data can be analysed using Krenchels rule of mixtures for short-fibre composites:

$$Y_C = \eta_o \eta_l Y_{NT} V_f + (1 - V_f) Y_P \quad (4)$$

where $Y_C$, $Y_{NT}$ and $Y_P$ are the composite, nanotube and polymer moduli, $V_f$ is the volume fraction and $\eta_o$ and $\eta_l$ are efficiency factors related to fibre orientation and length. It has previously been shown that PVA-MWNT films formed by slow drying tend to contract. This promotes the preferential orientation of the nanotubes in the plane of the film resulting in a value of $\eta_o$ close to the theoretical in-plane value of $\eta_o=3/8$ The fibre length efficiency factor is given by Cox's equations:

$$\eta_l = 1 - \frac{\text{Tanh}(l_{eff}\beta/2)}{l_{eff}\beta/2} \quad (5)$$

where $l_{eff}$ is the nanotube effective length and β is given by $$\beta = \sqrt{\frac{-4G}{R^2 Y_{NT} \ln V_f}} \quad (6)$$

where R is the nanotube radius, $V_f$ is the nanotube volume fraction, G is the polymer shear modulus which was found using the expression G=Y/2(1+ν) where ν is the Poisson's ratio; which was taken as ⅓ in this case. It was attempted to fit equation 4 to the data, using the expression for $\eta_l$ given by equations 5 and 6 and using $\eta_o=3/8$, with $l_{eff}$ and $Y_{NT}$ as free parameters. It was found that these two parameters were highly correlated to each other and so they cannot be reliably determined from the fitting procedure if they are both used as free parameters. It is known that catalytic MWNT tend to have modulus values in the region of 10-500 GPa. When $Y_{NT}$ was set to values in this range and equation 4 was fit to the data with $l_{eff}$ as a free parameter it was found that the model did not adequately fit to the data. This strongly suggests that we cannot use Cox's length efficiency factor for experiments with small data sets. This means we can only calculate an effective nanotube modulus given by $Y_{Eff}=\eta_l Y_{NT}$. This analysis gives effective nanotube moduli of 1984±239 GPa. The fibre length efficiency factor, must be less than unity. This means that the product $\eta_l Y_{NT}$ should be lower than the true nanotube modulus. However the effective modulus for the PVA based composites is much too large, agreeing with previous suggestions that Krenchel's rule does not always apply well to nanotube based composites. This analysis shows that for the PVA matrix composites, another model is required that takes into account the presence of the crystalline coating, the large polymer nanotube surface area and the interfacial stress transfer.

Figure 18:
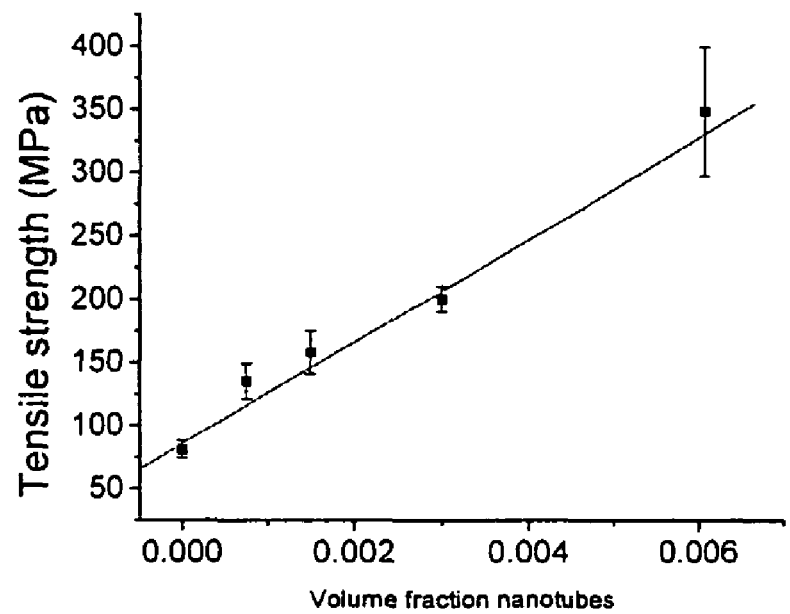
FIG. 18 is a plot of ultimate tensile strengths as a function of volume fraction for PVA based composites.

The ultimate tensile strength, $\sigma_C$, for composite films are shown in FIG. 18, as a function of volume fraction. For the PVA based composites $\sigma_C$ increases linearly from 81.0±7.0

MPa for the pure polymer to 348±51 MPa for the 0.6 vol % sample with a slope of $d\sigma/dV_f$=40±4 GPa Again, as far as the authors are aware this increase, by a factor of ×4.3 at very low volume fraction, represent the largest strength increase reported to date in bulk polymer-nanotube composites. It should be pointed here that the strength of the 0.6 vol % PVA based composite is already comparable to that of mild steel. By linear extrapolation a 2% composite would be as strong as hardened steel.

Tensile strength for short-fibre composites with homogenous matrices (no crystallinity) can be modelled using the following equation:

$$\sigma_C = \left(\frac{l_{NT}\tau}{2R} - \sigma_P\right)V_f + \sigma_P \qquad (7)$$

where $\tau$ is the interfacial stress transfer and $\sigma_P$ is the polymer tensile strength. This equation is derived under the assumption that the composite fracture surface has two components, in the bulk polymer and at the polymer-nanotube interface. Fitting this equation to the data in FIG. 18 and using $l_{NT}$=1.72±0.4 μm gives values of the interfacial stress transfer of 348±231 MPa. However, a value of $\tau$ as high as 350 MPa for the PVA based materials is hard to believe as the expected values for non-covalently bonded nanotube-polymer interfaces are in the region of 10 MPa.

The reason for the discrepancy between the value of r extracted from the PVA composite data and the expected value is the presence of the crystalline coating. When nanotubes are pulled out of a PVA based composite film they remain coated with a layer of PVA. We have observed this by SEM with measured values of b=25±10 nm for the thickness of the (crystalline) coating. This occurs because the interfacial crystalline PVA bonds very strongly with the nanotubes resulting in a very high interfacial stress transfer. In addition the crystalline PVA is itself stronger than amorphous PVA. This results in the fracture of the crystalline PVA/amorphous PVA interface. This is supported by the very good agreement of the thickness of the crystalline coating as measured by DSC (b=21±7 nm) and the thickness of the coating as measured by SEM of the fracture surface (b=25±10 nm). Thus the fracture surface of a PVA-nanotube composite has two components, in the bulk polymer and at the crystalline PVA/amorphous PVA interface.

This allows us to develop a model for the strength of polymer-nanotube composites with crystalline interface regions. In order to fracture a film fabricated from such a material it is necessary to break the two components of the fracture surface. The force, $F_B$, required for this can be expressed as $$F_B = \sigma_P A_{bulk} + \sigma_{shear} A_{Interface} = \sigma_C A \qquad (8)$$

where $\sigma_P$ is the polymer tensile strength, $A_{bulk}$ is the area of the bulk component of the fracture surface, $\sigma_{shear}$ is the polymer shear strength and $A_{Interface}$ is the area of the interface component of the fracture surface. In addition $\sigma_C$ is the composite tensile strength and A is the cross sectional area of the film. As $\sigma_P$ and $\sigma_{shear}$ are known or can be measured the problem is reduced to the calculation of the two components of the area.

In a composite, each nanotube can be thought of as occupying a certain volume of the film. This volume per nanotube, $V_{NT}$ can be found by rearranging equation 2 into:

$$V_{NT} = \frac{V}{N} = \frac{\pi R^2 l_{NT}}{V_f} \qquad (9)$$

If we model the volume per nanotube as a cylinder of length $l_{NT}$ and diameter 2a, then $$V_{NT} = \pi a^2 l_{NT} \qquad (10)$$

giving $$a = \frac{R}{\sqrt{V_f}} \qquad (11)$$

If we assume the nanotubes are aligned then any cross section of the film perpendicular to the direction of alignment will intersect n nanotubes where n is given by $$n = \frac{A}{\pi a^2} = \frac{A V_f}{\pi R^2} \qquad (12)$$

This allows us to calculate the two components of surface area. The bulk component, $A_{bulk}$, is just given by the area of the cross-section not occupied by crystalline coated nanotubes:

$$A_{bulk} = A - n\pi(R+b)^2 \qquad (13)$$

The interface component is just the sum of the surfaces of all the nanotubes protruding from the fracture surface:

$$A_{Interface} = n 2\pi(R+b)l_P \qquad (14)$$

where $l_P$ is the pullout length of the nanotubes. When fracture occurs the nanotube is pulled out of the side of the break where the embedded length is shorter. This means that the pullout length can vary from zero up to half the nanotube length. It follows that the average pullout length is a quarter of the total nanotube length: $l_P = l_{NT}/4$. This is verified by the data presented in the histograms in FIG. 15. Furthermore the verification of this equation means that the nanotubes do not break on film fracture. This means that the nanotubes are in general much shorter than the critical length, justifying our use of short fibre theory. The critical length, $l_C$, is given by $l_C = \sigma_{NT} R/\tau$, where $\sigma_{NT}$ is the nanotube strength ($\sigma_{NT} \approx 50$ GPa). Thus, $l_{NT} \ll l_C$ means that the interfacial stress transfer satisfies the inequality $\tau \ll 218 \pm 166$ MPa. This makes it unlikely that the value of $\tau$=348±213 MPa calculated for the PVA based composites using equation 7 is correct.

Inserting equations 12, 13 and 14 into equation 8 and using $l_P = l_{NT}/4$ leads to an equation for composite strength as a function of volume fraction:

$$\sigma_C = \left(1 + \frac{b}{R}\right)\left[\frac{l_{NT}}{2R}\sigma_{Shear} - \left(1 + \frac{b}{R}\right)\sigma_P\right]V_f + \sigma_P \qquad (15)$$

As expected this equation reduced to equation 7 in the limit when b=0 and $\sigma_{Shear} = \tau$. This equation can be fit to the data presented in FIG. 8a. As all the other parameters are known, $\sigma_{Shear}$ can be calculated from the fit. A value of 95±64 MPa was obtained. This is a reasonable value as the shear strength is expected to lie between the shear yield strength value of 41 MPa and the tensile strength which was measured here to be 81 MPa.

In addition, the fact that PVA tends to break before the PVA/nanotube interface gives us a lower bound for the interfacial stress transfer. As the fracture is observed in the PVA, the force to create the observed fracture surface must be less than the force to create a fracture surface at the polymer nanotube interface. Thus, $(R+b)^2 \sigma_{shear} < R^2 \tau$. In conjunction with the upper value obtained earlier, this tells us that the PVA-nanotube interfacial stress transfer must lie in the bounds $179 < \tau << 384$ MPa. This lower bound is extremely high compared with the expected value. This demonstrates the possibility of extremely good stress transfer, even without covalent bonding. That this value is so high, is in fact the reason why the fracture does not occur at the polymer-nanotube interface. This extremely large stress transfer leads to excellent mechanical properties The self-consistency of the overall analysis indicates that this model does indeed describe the tensile strength of this class of composites. This is an important result as, in describing the fracture mechanism, it elucidates the conditions necessary for efficient reinforcement. Of these, probably the most important is the maximisation of b/R. In cases where the matrix polymer is known to crystallise on the nanotube surface the composite processing method should be optimised to maximise crystallisation. In addition post-processing treatment such as tempering can be carried out to this end. Furthermore, this criterion should not be incompatible with the suggestion that Youngs modulus of polymer-nanotube composites is maximised by minimising (multiwall) nanotube diameter. This strongly suggests the optimum tube types for composite reinforcement are those with very low diameters which can seed very thick polymer crystal coatings.

We suggest that b can be increased even further by covalently attaching molecules by one of their ends to the nanotubes. The material would be unlikely to fracture in the region occupied by these end-attached functional groups as this would involve the breaking of covalent bonds. This would result in the fracture surface being shifted even further away from the nanotube surface by a distance related to the length of the functional group. In addition the presence of these functional groups is known to improve nanotube dispersibility, which may result in the achievement of high loading levels.

Figure 19:
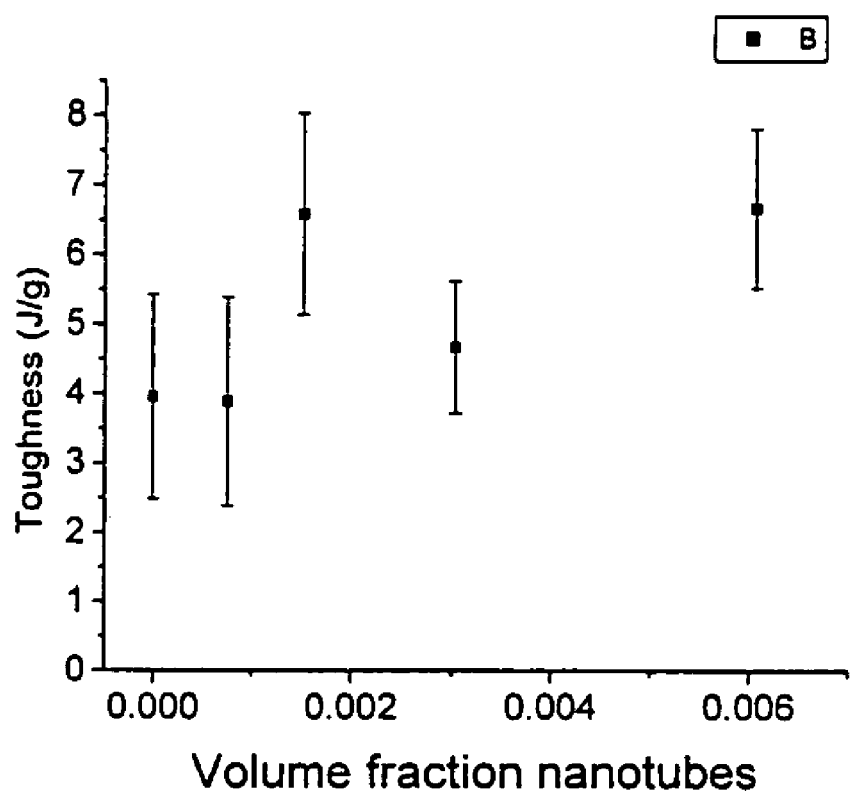
FIG. 19 is a plot of toughness as a function of volume fraction for PVA based composites.

The toughness is defined as the work done to break a sample but is usually quoted as the work done per unit mass. This parameter can be found by integrating the stress-strain curve and dividing by the sample density. Shown in FIG. 19 is the toughness data for the PVA based composite. For the PVA based materials this parameter increases marginally from 4.0±1.5 J/g for PVA to 6.7±1.1 J/g for the 0.6 vol % composite. The scatter in this graph can be attributed to the non-perfect nature of the nanotube dispersion in the PVA matrix. The relatively low error margins and smooth nature of this curve strongly suggests that the dispersion is very good in these samples. This is expected as the presence of appropriate functional groups is expected to strongly improve the dispersibility of nanotubes on any matrix.

In the invention solution based polymer-MWNT composite thin films were fabricated. For PVA based composites it was found that the nanotubes nucleated the growth of an ordered crystalline coating. The resulting composites demonstrated significant increases in Young's modulus, tensile strength and toughness of ×3.7, ×4.3 and ×1.7, respectively. Analysis using Krenchel's rule of mixtures gave unexpected values for nanotube modulus and effective length suggesting that this model may not apply for polymer-nanotube composites. In addition a model describing the strength increase is described. This model predicts the increase in composite strength with the thickness of crystalline coating illustrating the importance of this interface layer.

Applications for Nanotube Polymer Composites

It will be appreciated that the presence of nanotubes in conjunction with a polymer has many benefits. The nanotubes give mechanical reinforcement to the polymer. The introduction of thermally conductive nanotubes should dramatically reduce any susceptibility of the polymer to thermal degradation. Thermal degradation is one of the major reasons for the limited lifetime of luminescent polymers. Other notable benefits are a huge increase in conductivity of the order of $10^6$ due to the introduction of nanotubes. The introduction of nanotubes also reduces aggregation affects and helps to suppress inter-chain non-radiative decay.

The nanotube polymer composites of the invention have technological applications comprising antistatic coatings and packaging as well as semi-conductor devices including light emitting diodes. The nanotube polymer composite has electrical conductivity of up to 10 $Sm^{-1}$ and has application for use in static protection. The nanotube polymer composite also has application for use in superconductivity; mechanical reinforcement: domestic, automotive and aerospace; optoelectronic technologies, telecommunications, signal processing (large non-linear optical effects). The invention provides a polymer nanotube composite material with relatively high electrical conduction which can be blended with other plastics or used as is.

Nanotubes can be used for static protection in a matrix with polymers and oligomers, conjugated and non-conjugated which can also be used in:—

Fibre brushes or static dissipaters laser and matrix printer packaging, paper, foils, glasses, plastics, converting, printing, carpets, aircraft engines, appliances, broadcasting, industrial (lighting products, electrical control and distribution products), and electric motors materials (high-performance engineered plastics, resins, silicones, and laminates), power systems, technical products and services (medical systems and data interchanges services) fan blade combuster, nozzle materials, and containment for the High speed Civil Transport, autoclaves, compression moulding and resin transfer moulding equipment, firing furnaces, and hot isostatic presses automotive, industrial chopped fibre reinforcements for injection moulding, and blended and alloyed polymers for use as matrices in fibre reinforced composites. Aircraft are being developed with carbon reinforced plastic wings and fuselage, and very soon a rust proof reinforced plastic car will become an economic reality, protection of various equipment that generally move using non-conductive materials in their process which can cause equipment malfunctions, or even severe damage to the many device, mechanical and electronic. The nanotubes can induce an increase in conductivity to provide this protection. Mixed into heat resistant and flame retardant resins used to make plastic part and alloyed with lead in solder. Electrical wiring, motor windings, radiators, bushings, instruments and electronic parts. Drawn into electrical wire, alloyed with tin and zinc to make brass castings. Glass, dashboard, body panels. Compounded with other minerals, resins and pigments to make body panels and paints. Fused with other minerals including clays to make ceramic parts, and a component in manufacturing glass, electronic components and special wiring connectors for "air bags". Used pure and plated onto the surface of other metals, paint, tires, plastics, and ceramics. Compounded with other minerals, resins, and pigments to make interior door panels, upholstery, dashboards, and composite body panels. Combined with natural and synthetic rubber to make tires and coolant, vacuum, and fuel hoses, "Metallic" paints, interior trim, dash board, steering wheel, tires, sound proofing, weather stripping, and other plastics and rubber parts. Compounded with other minerals, resins and pigments to make paints, interior door panels, trim parts, dash boards, and composite body panels. Combined with natural and synthetic rubber to make tires and coolant, vacuum, and fuel hoses. Included in all non-metal parts and as coatings and paint on metal parts. Compounded with other minerals, resins and pigments to make interior paint, coatings, door panels, upholstery, dash boards, and composite body panels. Plastic parts, rubber parts such as seats, cushions, dash board, carpet fibres, vacuum, fuel, hydraulic, and air hoses, tires, body panels; and indicator lenses. Interior trim, dash board, steering wheel, tires, sound proofing, weather stripping, and other plastics and rubber parts. Intake manifold, transmission housing and other cast aluminium parts, plastic parts. As a flux in recycling aluminium and in preventing oxidation during casting of aluminium parts, as feed stocks for chlorine manufactured to produce resins to make paints, interior door panels, trim parts, dash boards, and composite body panels. Glass, electronic parts, paints, plastics, composites, engine, manifolds, rubber parts, light bulbs, and more. Used in moulds for cast parts. Used to make sodium silicate "water glass" for adhesives and sealants. Spark plugs, high temperature ceramic paints, plastics, composites, rubber parts, tires, light bulb bases, and more. Combined with clays, feldspar, silica, and fluorspar to make spark plugs and other ceramic components.

The nanotubes can induce an increase in conductivity to provide this protection. Also to be used as applications in fibre-reinforced composites, elastic-plastic fibre-reinforced composite materials, fibre-reinforced composite materials for strength which can prevent failure seen in other matrix composites since the onset of plastic yielding starts very early in the loading process as compared to the composite's ultimate strength. Elastic-plastic behaviour of nanotube-plastic composites consisting of aligned and non-aligned, continuous elastic filaments can be described in terms of the constituent properties, their volume fractions, and mutual constraints between phases indicated by the geometry of the microstructure.

The nanotube composite prevents degradation of plastics in light, heat and air, and reinforces the plastic for strength and durability.

The nanotube composite can be used in part for space suit manufacture and fabrication, EMF shielding for the suit. It may also be used to form a radiowave "shield" for applications such as stealth plane, military vehicles and vessels, rockets and space vehicles of all types. The composite can be used to provide a protective coating in part or full for vehicles such as space vehicles, aeroplanes, ships and tanks.

The invention is not limited to the embodiments hereinbefore described which may be varied in detail.

REFERENCES

1. M.-F. Yu, B. S. Files, S. Arepalli, R. S. Ruoff, Phys. Rev. Lett. 84, 5552 (2000)
2. D. A. Walters, L. M. Ericson, M. J. Casavant, J. Liu, D. T. Colbert, K. A. Smith, R. E. Smalley, Appl. Phys. Lett. 74, 3803 (1999)
3. D. Qian, E. C. Dickey, R. Andrews and T. Rantell, Appl. Phys. Lett. 76, 2868 (2000).
4. A. P. Davey, A. Drury, S. Maier, H. J. Byrne, and W. J. Blau, Synth. Met., 103, 2478 (1999).
5. J. N. Coleman, A. B Dalton, S. Curran, A. Rubio, A. P. Davey, A. Drury, B. McCarthy, B. Lahr, P. M Ajayan, S. Roth, R. C Barklie and W. J. Blau, Advanced Materials 12 (2000) 231.
6. Murphy et al. High Yield, Non-destructive Purification and Quantification Method for Carbon Nanotubes Journ. Phys. Chem. B 106 (2002) 3087-3091
7. Cadek, M.; Murphy, R.; McCarthy, B.; Drury, A.; Lahr, B.; Barlie, R. C.; in het Panhuis, M.; Coleman, J. N.; Blau, W. J. Carbon 2002, 40, 723.
8. Delpeux, S.; Szostak, K; Frackowiak, E.; Bonnamy, S.; Beguin, F.; J. Nanosci. Nanotechnol. 2002, 2, 481-484.
9. Pierard, N.; Fonseca, A.; Konya, Z.; Willems, I.; Tendeloo, G. V.; Nagy, J. B.; Chem. Phys. Lett. 2001, 335, 1.

The invention claimed is:

1. A composite material comprising
   nanotubes; and
   a polymer matrix
wherein the nanotubes and polymer interact in an ordered fashion at an interfacial region so that the polymer wraps around the nanotubes, said region comprising a coating of polymer on the nanotubes in a crystalline or semi crystalline form, the interfacial region being between 5 and 160 nm in width.

2. The composite as claimed in claim 1 wherein the interfacial region is between 5 and 80 nm in width.

3. The composite as claimed in claim 1 wherein the interfacial region is between 5 and 50 nm in width.

4. The composite as claimed in claim 1 wherein the polymer is amorphous.

5. The composite as claimed in claim 1 wherein the polymer is at least partially hydrophilic.

6. The composite as claimed in claim 1 wherein the polymer is amphiphilic.

7. The composite as claimed in claim 1 wherein the polymer is at least partially non-polar.

8. The composite as claimed in claim 1 wherein the polymer is at least partially hydrophobic.

9. The composite as claimed in claim 1 wherein the polymer has a linear rod-like structure.

10. The composite as claimed in claim 1 wherein the polymer has a Youngs Modulus of between 0.2 and 8 GPa.

11. The composite as claimed in claim 1 wherein the polymer has a Youngs Modulus of between 0.2 and 4 GPa.

12. The composite as claimed in claim 1 wherein the polymer has a Youngs Modulus of between 0.2 and 2 GPa.

13. The composite as claimed in claim 1 wherein the polymer is poly(m-phenylenevinylene-co-2,5-dioctyloxy-p-phenylenevinylene (PmPV)).

14. The composite as claimed in claim 1 wherein the polymer is selected from any one or more of polyvinylalcohol (PVA), polyvinylpyrrolidone (PVP), polyvinylacetate (PVAc), polyvinylalcohol-co-ethylene (PVA-co-E), polyvinylformal (PVF), polyvinylnaphtalene (PVN), polyvinylphenol (PVPh), polyvinylpyridine-co-styrene (PVPy-co-S), or any substituted polyalkane.

15. The composite was claimed in claim 1 wherein the nanotube is selected from any one or more of a carbon nanotube, a boron-nitride nanotube, inorganic nanowires made from silicon, germanium, inorganic nanotubes made from $MoS_2$, $WS_2$ or any generalized chalcogenide nanotubes.

16. The composite as claimed in claim 1 wherein the nanotube is a carbon nanotube selected from a single wall nanotube (SWNT), a double wall nanotube (DWNT), a multiwall nanotube (MWNT) or a nanotube produced by arc discharge, laser processing or catylitic decomposition of carbon containing molecules.

* * * * *